United States Patent [19]

Yamamoto et al.

[11] Patent Number: 5,288,817
[45] Date of Patent: Feb. 22, 1994

[54] POLYARYLENE SULFIDE RESIN COMPOSITIONS

[75] Inventors: Naoki Yamamoto; Akira Nakata; Atsunori Koshirai, all of Otake, Japan

[73] Assignee: Mitsubishi Rayon Co., Ltd., Tokyo, Japan

[21] Appl. No.: 2,409

[22] Filed: Jan. 8, 1993

Related U.S. Application Data

[63] Continuation-in-part of Ser. No. 774,777, Oct. 10, 1991, abandoned.

[30] Foreign Application Priority Data

Oct. 11, 1990 [JP] Japan .................. 2-272613

[51] Int. Cl.$^5$ .............................. C08L 51/06
[52] U.S. Cl. .......................... 524/504; 524/500; 525/63; 525/474; 525/479; 525/537; 525/903
[58] Field of Search .............. 525/63, 479, 474, 537, 525/903; 524/504, 500

[56] References Cited

U.S. PATENT DOCUMENTS 4,797,448  1/1989  Liang ..................... 525/106

FOREIGN PATENT DOCUMENTS 0142825  5/1985  European Pat. Off. .
0332188  9/1989  European Pat. Off. .
0369244  5/1990  European Pat. Off. .
0369245  5/1990  European Pat. Off. .
0389905 10/1990  European Pat. Off. .
56-118456  9/1981  Japan .
58-154757  9/1983  Japan .
59-207921 11/1984  Japan .
61-21156  1/1986  Japan .
WO89/00181  1/1989  Japan .

Primary Examiner—Ralph H. Dean
Attorney, Agent, or Firm—Armstrong, Westerman, Hattori, McLeland & Naughton

[57] ABSTRACT

A polyarylene sulfide resin composition excellent in compatibility between a polyarylene sulfide resin and a polyorganosiloxane graft copolymer is obtained by melt-mixing a composition consisting essentially of 60 to 99 parts by weight of a polyarylene sulfide resin, to 40 parts by weight of a polyorganosiloxane graft copolymer which was obtained by graft-polymerizing one or more kinds of a vinyl monomer onto particles of a compound rubber consisting of a polyorganosiloxane rubber component and a polyalkyl (meth)acrylate rubber component inseparably united with each other, and 0.01 to 10 parts by weight of and organic silane compound having an epoxy group per 100 parts of the mixture.

8 Claims, No Drawings

POLYARYLENE SULFIDE RESIN COMPOSITIONS

CROSS-REFERENCE TO RELATED APPLICATION

This application is a continuation-in-part of U.S. patent application Ser. No. 07/774,777 filed Oct. 10, 1991, now abandoned.

BACKGROUND OF THE INVENTION

1. Field of the Invention

The present invention relates to a polyarylene sulfide resin composition which has been improved in impact resistance and besides with which molded products having excellent appearance can be produced.

2. Related Art

Compositions in which the impact resistance of a polyarylene sulfide resin has been improved are proposed in Japanese Patent Application Kokai Nos. 56-118456, 58-154757, 59-207921, 61-21156, W089/00181, etc. These compositions are those obtained by blending the polyarylene sulfide resin with various rubber components such as a styrene/butadiene block copolymer, ethylene/glycidyl methacrylate copolymer, ethylene/butene copolymer, EP rubber and the like.

However, such compositions have problems that: The molding temperature of the polyarylene sulfide resin is as high as 290° C. or more, and in such a temperature region, the common diene rubber components and olefin rubber components deteriorate by heat, so that it is difficult to say that a sufficient effect can be obtained in improving the impact resistance. And also, molded products obtained from such compositions are inferior in appearance.

As compositions intended to improve the above defects, a blend of the polyarylene sulfide resin and a polyorganosiloxane rubber is proposed in EP-A2-0142825. Since, however, this polyorganosiloxane rubber is crumbs of a crosslinked silicone rubber and also the silicone rubber is poor in compatibility with the polyarylene sulfide resin, there is a problem that sufficient improvement in the impact strength cannot be attained.

For this reason, the present applicants previously proposed a composition obtained by adding a polyorganosiloxane graft copolymer to the polyarylene sulfide resin in EP-A2-0332188 and EP-A2-0369245, and a composition obtained by blending the polyarylene sulfide resin, a polyorganosiloxane rubber and a particular organic silane compound in EP-A2-0369244.

The composition obtained by adding a polyorganosiloxane graft copolymer to the polyarylene sulfide resin has a markedly improved impact resistance as compared with the common compositions obtained by blending the polyarylene sulfide resin and a diene rubber or a polyolefin rubber. However, there are uses in which a further higher impact strength than that of the above composition is required. The composition obtained by blending the polyarylene sulfide resin, a polyorganosiloxane rubber and a particular organic silane compound is in a satisfactory level in terms of development of impact strength but it has a problem that molded products obtained therefrom has a poor appearance.

SUMMARY OF THE INVENTION

In view of the situation mentioned above, the present inventors have extensively studied to obtain a polyarylene sulfide resin composition which has been improved in the impact resistance without much injuring the heat resistance and mechanical Properties inherent to the polyarylene sulfide resin, and which gives molded products having excellent appearance and improved strength. As a result, the present inventors have found that the above object can be attained by blending the polyarylene sulfide resin with a particular polyorganosiloxane graft copolymer and an organic silane compound having a particular functional group. The present inventors thus attained to the present invention.

The gist of the present invention consists in a polyarylene sulfide resin composition obtained by melt-mixing a composition consisting essentially of 60 to 99 parts by weight of a polyarylene sulfide resin (component A).

1 to 40 parts by weight of a polyorganosiloxane graft copolymer (component B) obtained by graft-polymerizing one or more kinds of vinyl monomer onto a compound rubber of 0.08 to 0.6 μm in average particle size consisting of a polyorganosiloxane rubber component and a polyalkyl (meth)acrylate rubber component and having such a structure that 1 to 99 wt. % of the polyorganosiloxane rubber component and 1 to 99 wt. % of the polyalkyl (meth)acrylate rubber component have been inseparably entangled with each other, the total amount of the components A and B being 100 parts by weight, and an organic silane compound having an epoxy group (component C) of 0.01 to 10 parts by weight based on 100 parts by weight of the total amount of the components A and B.

PREFERRED EMBODIMENTS OF THE INVENTION

The polyarylene sulfide resin used as the component A in the present invention is a polymer having as a main constituent unit a repeating unit represented by the formula,

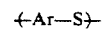

wherein Ar is one or more members selected from the group consisting of

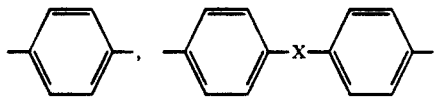

and their derivatives having 1 to 8 substituents (e.g. a halogen atom, methyl group) at the aromatic rings. In the above formula,

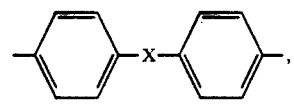

X represents $-SO_2-$,

—O— or an alkylene group of which the main chain has 1 to 5 carbon atoms and which may have a lower alkyl side chain. This polymer may be composed of a straight-chain structure alone, or may contain a branched chain. Further, it may have a crosslinked structure as far as it has a melt-processability.

A polyphenylene sulfide resin is preferred as the polyarylene sulfide resin used in the present invention.

The polyorganosiloxane graft copolymer used as the component B in the present invention is a copolymer obtained by graft-polymerizing one or more kinds of vinyl monomer onto a compound rubber consisting of 1 to 9 wt. % of the polyorganosiloxane rubber component and 1 to 99 wt. % of the polyalkyl (meth)acrylate rubber component, the total amount of both the rubber components being 100 wt. %, having such a structure that both the rubber components are entanguled with each other and substantially inseparable from each other and besides having an average particle size of 0.08 to 0.6 μm.

If either one of the polyorganosiloxane rubber component or polyalkyl (meth)acrylate rubber component, or a simple mixture of the both is used as a rubber source in place of the above compound rubber, such a composition having excellent performance as the resin composition of the present invention is not obtained. Resin compositions having excellent impact resistance and giving molded products having excellent appearance can be obtained only when the polyorganosiloxane rubber component and polyalkyl (meth)acrylate rubber component are entangled and united with each other.

When the amount of the polyorganosiloxane rubber component constituting the compound rubber exceeds 99 wt. %, the resin composition of the present invention obtained gives molded products having a bad appearance. When the amount is less than 1 wt. %, the resin composition of the present invention obtained gives molded products having an insufficient impact resistance. Because of this, the amount of any one of the rubber components constituting the compound rubber needs to be 1 to 99 wt. %, provided that the total amount of the rubber components is 100 wt. %. More preferably, the amount is in a range of 5 to 95 wt. %.

It is desirable that the average particle size of the above compound rubber is in a range of 0.08 to 0.6 μm. When the average particle size is less than 0.08 μm, the resin composition of the present obtained gives molded products having an insufficient impact resistance. When it exceeds 0.6 μm, the appearance of the molded products becomes bad.

For producing the compound rubber having such an average particle size, it is desirable to employ the emulsion polymerization method. That is, it is desirable to firstly produce the latex of the polyorganosiloxane rubber and then add the materials for synthesizing the polyalkyl (meth)acrylate rubber to this latex to impregnate the polyorganosiloxane rubber particles with these materials, after which these materials are polymerized at this state.

The polyorganosiloxane rubber component constituting the compound rubber used in the present invention is prepared from an organosiloxane and a crosslinking agent for the polyorganosiloxane rubber. In preparing the above rubber component, a graft-linking agent for the polyorganosiloxane rubber may be added as an additional component.

As the organosiloxane used to prepare the polyorganosiloxane rubber component, three or more-membered cyclic organosiloxanes are given, among which three to six-membered ones are preferably used. Examples of such the cyclic organosiloxane include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane and the like. These cyclic organosiloxanes may be used alone or in mixture of two or more of them. The amount of the organosiloxane used to prepare the polyorganosiloxane rubber component is 50 wt. % or more, preferably 70 wt. % or more of the polyorganosiloxane rubber component.

The crosslinking agent for the polyorganosiloxane rubber refers to a silane compound having three or four lower alkoxy groups, i.e. trialkoxyalkylsilanes, trialkoxyphenylsilanes or tetraalkoxysilanes. Specific examples of the crosslinking agent include trimethoxymethylsilane, triethoxyphenylsilane, tetramethoxysilane, tetraethoxysilane, tetrapropoxysilane, tetrabutoxysilane and the like. Preferred ones are tetraalkoxyslianes, among which tetraethoxysilane is particularly preferred. The amount of the crosslinking agent for the polyorganosiloxane rubber is 0.1 to 30 wt. % of the polyorganosiloxane rubber component.

The graft-linking agent for the polyorganosiloxane rubber refers to a siloxane having a functional group which does not react at the step of preparation of the polyorganosiloxane rubber, but reacts at the subsequent steps, i.e. at the step of graft-polymerization or the step of preparation of the poly(meth)acrylate rubber which is carried out for preparing the compound rubber. As specific examples, compounds which can form an organosiloxane unit represented by either one of the formulae (I), (II), (III) and (IV) are given:

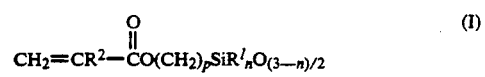 (I)

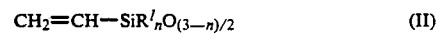 (II)

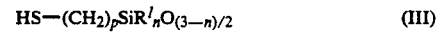 (III)

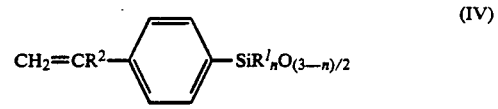 (IV)

wherein $R^1$ represents a methyl, ethyl, propyl or phenyl group, $R^2$ represents a hydrogen atom or a methyl group, n represents an integer of 0, 1 or 2, and p represents an integer of 1 to 6. Of these compounds, (meth)acryloyloxy(alkyl)siloxane which forms the unit of the formula (I) is desirable because its grafting efficiency at the time of graft-polymerization is so high that effective graft chains can be formed, as a result of which the impact resistance of the composition of the present invention produced therefrom becomes more superior.

As those which can form the unit of the formula (I), methacryloyloxyalkylmono-, di- or trialkoxysilane is preferred. Specific examples thereof include β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilane and the like.

As examples of those which can form the unit of the formula (II), vinylmethyldimethoxysilane, vinyltrimethoxysilane and the like can be given.

As examples of those which can form the unit of the formula (III), γ-mercaptopropyldimethoxymethylsilane, γ-mercaptopropyltrimethoxysilane, γ-mercaptopropyldiethoxyethylsilane and the like can be given.

As examples of those which can form the unit of the formula (IV), p-vinylphenyldiethoxyethylsilane, p-vinylphenyltriethoxysilane and the like can be given.

The amount of the graft-linking agent for the polyorgahosiloxane rubber is 0 to 10 wt. % of the polyorganosiloxane rubber component.

The polyorganosiloxane rubber can be obtained by the methods described, for example, in U.S. Pat. Nos. 2,891,920, 3,294,725, etc. It is preferred, however, to produce the rubber by the method in which a mixed solution of organosiloxane, the crosslinking agent for the polyorganosiloxane rubber and if necessary the graft-linking agent for the polyorganosiloxane rubber is shear-mixed with water using, for example, a homogenizer in the presence of a sulfonic acid emulsifier such as an alkylbenzenesulfonic acid, an alkylsulfonic acid and the like. As the sulfonic acid emulsifier, the alkylbenzenesulfonic acid is preferably used because it acts as an emulsifier for organosiloxane and at the same time acts as a polymerization initiator. In this case, it is preferred to use the metal salt of the alkylbenzenesulfonic acid or alkylsulfonic acid together with the above sulfonic acid because the metal salt has an effect to keep the emulsified state of the polymer stable during the graft polymerization.

The compound rubber relating to the component B constituting the resin composition of the present invention comprises the polyorganosiloxane rubber component and the polyalkyl (meth)acrylate rubber component. It is obtained by adding an alkyl (meth)acrylate, the crosslinking agent for the polyalkyl (meth)acrylate rubber and the graft-linking agent for the polyalkyl (meth)acrylate rubber to the latex of the above polyorganosiloxane rubber to impregnate the polyorganosiloxane rubber with these components and then polymerizing these components.

As the alkyl (meth)acrylate used to prepare the compound rubber, there can be given the acrylate of a straight-chain or branched-chain alkyl group having 1 to 8 carbon atoms and the methacrylate of an alkyl group having 6 to 12 carbon atoms. Specific examples of these acrylate and methacrylate include methyl acrylate, ethyl acrylate, n-propyl acrylate, isopropyl acrylate, n-butyl acrylate, isobutyl acrylate, sec-butyl acrylate, 2-methylbutyl acrylate, 3-methylbutyl acrylate, 3-pentyl acrylate, hexyl acrylate, heptyl acrylate, 2-heptyl acrylate, octyl acrylate, 2-octyl acrylate, 2-ethylhexyl acrylate, hexyl methacrylate, octyl methacrylate, decyl methacrylate, lauryl methacrylate, 2-ethylhexyl methacrylate and the like. Of these, butyl acrylate can be given as a preferred one.

As the crosslinking agent for the polyalkyl (meth)acrylate rubber, (meth)acrylates having 2 or more polymerizable unsaturated bonds are used. Specific examples thereof include ethylene glycol dimethacrylate, propylene glycol dimethacrylate, 1,3-butylene glycol dimethacrylate, 1,4-butylene glycol dimethacrylate and the like.

The graft-linking agent for the polyalkyl (meth)acrylate rubber is a monomer having 2 or more polymerizable unsaturated groups. These unsaturated groups are incorporated into the rubber by polymerization at the time of preparation of the polyalkyl (meth)acrylate rubber, but at least a part of them remains unpolymerized at that time and reacts to form a graft bond at the time of the subsequent graft polymerization. Specific examples of such a graft-linking agent include triallyl cyanulate, triallyl isocyanulate, allyl methacrylate and the like. Of these, allyl methacrylate works as both a crosslinking agent and a graft-linking agent as described below. That is, at the time of preparation of the polyalkyl (meth)acrylate rubber by polymerization, a part of allyl methacrylate reacts at both of the two polymerizable unsaturated groups to form a crosslinked structure, and the remainder reacts at only one of the unsaturated groups, the other unsaturated group remaining free at that time and reacting to form a graft bond at the time of the subsequent graft polymerization.

Each of these crosslinking agent and graft-linking agent for the polyalkyl (meth)acrylate rubber may be a simple compound or a mixture of two or more simple compounds. When allyl methacrylate is used, it may function as both of a crosslinking agent and a graft-linking agent.

The amount of any one of the crosslinking agent and graft-linking agent for the polyalkyl (meth)acrylate rubber is 0.1 to 10 wt. % of the polyalkyl (meth)acrylate rubber component. When allyl methacrylate itself is used to function as both of a crosslinking agent and a graft-linking agent, it will suffice to use it in an amount of 0.2 to 20 wt. % of the polyalkyl (meth)acrylate rubber component.

For preparing the compound rubber, it will suffice to add the above alkyl (meth)acrylate and crosslinking agent and graft-linking agent for the polyalkyl (meth)acrylate rubber to the polyorganosiloxane rubber latex previously neutralized by adding the aqueous solution of an alkali (e.g. sodium hydroxide, potassium hydroxide, sodium carbonate), thereby impregnating the polyorganosiloxane rubber particles with these components, and then polymerize these components by the action of a common radical polymerization initiator in a state wherein the polyorganosiloxane rubber particles have been swollen. By this method, the network of the polyalkyl (meth)acrylate rubber entangled with that of the polyorganosiloxane rubber is formed with the progress of polymerization.

Thus, a compound rubber is obtained in which the polyorganosiloxane rubber component and polyalkyl (meth)acrylate rubber component have been entangled with each other to such a degree that they are substantially inseparable from each other. Further, when the graft-linking agent for the polyorganosiloxane rubber is used to synthesize the polyorganosiloxane rubber, bonds also are formed between the polyorganosiloxane rubber component and polyalkyl (meth)acrylate rubber component.

The compound rubber thus formed has such a structure that the above both rubber components can no longer be separated from each other by extraction with normal organic solvents such as acetone, toluene and the like. It is preferred for this compound rubber to have a gel content of 80% or more when the rubber is extracted with toluene at 90° C. for 12 hours.

A preferred compound rubber is one in which the main skeleton of the polyorganosiloxane rubber component has a repeating unit of dimethylsiloxane, and the main skeleton of the polyalkyl (meth)acrylate rubber component has a repeating unit derived from n-butyl acrylate.

The polyorganosiloxane graft copolymer used in the present invention is obtained by graft-polymerizing one or more kinds of vinyl monomer onto the above compound rubber. These vinyl monomers include methacrylates (e.g. methyl methacrylate, 2-ethylhexyl methacrylate), acrylates (e.g. methyl acrylate, ethyl acrylate, butyl acrylate), aromatic alkenyl compounds (e.g. styrene, halogen-substituted styrenes, α-methylstyrene, vinyltoluene), vinyl cyanide compounds (e.g. acrylonitrile, methacrylonitrile) and the like. These monomers are used alone or in combination of two or more of them.

Among these vinyl monomers, methyl methacrylate is preferably used.

In the above polyorganosiloxane graft copolymer, the contents of the compound rubber and vinyl monomer are preferably 30 to 95 wt. % and 5 to 70 wt. %, respectively, more preferably 70 to 95 wt. % and 5 to 30 wt. %, respectively. When the content of the vinyl monomer is less than 5 wt. %, the dispersion of the graft copolymer in the resin composition tends to become insufficient, and when it exceeds 70 wt. %, the impact strength tends to lower.

The graft copolymer used in the present invention can be obtained by one-stage or multi-stage radical polymerization of one or more kinds of vinyl monomer in the presence of the above compound rubber latex. In this graft polymerization, the component alone corresponding to the branch of the graft copolymer, which refers herein to a component derived from one or more kinds of vinyl monomer, polymerizes by itself without grafting onto the trunk component which refers herein to the compound rubber, to produce the so-called free polymer as by-product. Consequently, a mixture of the desired graft copolymer and the free polymer is obtained by the graft polymerization. In the present invention, however, this mixture is referred to as "graft copolymer".

Thus, the latex of the compound rubber graft copolymer is obtained. This graft copolymer, i.e. the component B, can be separated and recovered by adding the latex to hot water in which a metal salt (e.g. calcium chloride, magnesium sulfate) has been dissolved, to salt-out and coagulate the graft copolymer.

As the organic silane compound having an epoxy group used in the present invention, a mixture of one or more compounds represented by the formula (V) can be used:

$$Y-R^3-\underset{\underset{Z_m}{|}}{Si}-R^4{}_{(3-m)} \quad (V)$$

wherein m represents an integer of 1 to 3, $R^3$ represents a single bond or an alkylene group having 1 to 3 carbon atoms, $R^4$ represents a methyl or ethyl group and Y and Z represent groups selected from the following respective groups,

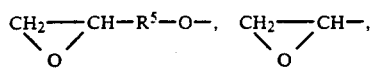

Z; —OR$^4$, —OCOR$^4$ or —Cl (in which R$^5$ represents an alkylene group having 1 to 3 carbon atoms, and R$^4$ is as defined above), provided that when Y represents a glycidyl group or a 3,4-epoxycyclohexyl group, R$^3$ represents a single bond or an alkylene group having 1 to 5 carbon atoms.

As specific examples of these organic silane compounds having an epoxy group, (3-glycidyloxypropyl)-trimethoxysilane, (3-glycidyloxypropyl)methyldiethoxysilane, 2-(3,4-epoxycyclohexyl)ethyltrimethoxysilane and the like can be given as preferred examples.

The polyarylene sulfide resin composition of the present invention is obtained by blending 60 to 99 parts by weight of the polyarylene sulfide resin (component A), 1 to 40 parts by weight of the polyorganosiloxane graft copolymer (component B), the total amount of the components A and B being 100 parts by weight, and the organic silane compound having an epoxy group (component C) of 0.01 to 10 parts by weight based on 100 parts by weight of the above total amount of the components A and B. It is preferred, however, that the amount of the component A is 65 to 95 parts by weight, that of the component B is 5 to 35 parts by weight and that of the component C is 0.3 to 6 parts by weight based on 100 parts by weight of the total amount of the components A and B.

When the amount of the component B is less than 1 part by weight based on 100 parts by weight of the total amount of the components A and B, an effect to improve the impact resistance of the polyarylene sulfide resin is poor. When it exceeds 40 parts by weight, the strength, stiffness and heat resistance of a molded product obtained from the composition tend to be injured. Such the amounts are not therefore preferred.

When the amount of the component C blended is less than 0.01 part by weight based on 100 parts by weight of the total amount of the components A and B, development of the impact strength is insufficient. When it exceeds 10 parts by weight, the flowability and the like are adversely affected. Such the amounts are not therefore preferred.

As far as the composition of the present invention contains the above resin components in the above blending ratio, a reinforcing filler can be additionally incorporated into the composition in an amount up to 300 wt. % based on the total amount of the components A, B and C, i.e. the resin components, in order to further improve the heat resistance, mechanical strength, etc. of the composition.

As the reinforcing filler, those having a fibrous form, granular form, powdery form, etc. may be used. The filler includes glass fibers, carbon fibers, asbestos, ceramics fibers, metal fibers, aramide fibers, silicon nitride, potassium titanate, silicon carbide, barium sulfate, calcium sulfate, calcium silicate, calcium carbonate, magnesium carbonate, antimony trioxide, zinc oxide, titanium oxide, magnesium oxide, iron oxide, molybdenum disulfide, mica, talc, kaolin, pyrophyllite, bentonite, sericite, zeolite, wollastonite, other clays, ferrite, graphite, gypsum, glass beads, glass balloons, etc.

When these fillers are used, their amount is preferably 10 to 300 parts by weight based on 100 parts by weight of the resin component. When the amount is less than 10 parts by weight, an effect obtained by adding the filler is poor, and when it exceeds 300 parts by weight, the melt-flowability of the composition lowers. Such the amounts are not therefore desirable. When these fillers are blended, known silane coupling agents can be used.

As far as there is no deviation from the object of the present invention, small amounts of a mold-release agent, coloring agent, heat stabilizer, UV absorber, foaming agent, anti-corrosive, flame retardant, flame-retarding assistant and the like may be incorporated into the resin composition of the present invention.

If the composition of the present invention is obtained by melt-mixing at least the above components A, B and C, the melt-mixing may be carried out by any means. It is however desirable to melt-knead the components A, B and C and if necessary the reinforcing filler in an extruder at a temperature higher than the melting point of the polyarylene sulfide resin and then pelletize the melt-kneaded product. It is preferred that the melt-kneading temperature is 290° to 340° C. When the temperature is less than 290° C., the melting of the polyarylene sulfide resin sometimes becomes insufficient, and when it is higher than 340° C., the polyorganosiloxane graft copolymer sometimes heat-deteriorates and turns gel, so that care is necessary.

The composition of the present invention, whether it contains a reinforcing filler or not, is excellent in the compatibility between the polyarylene sulfide resin and polyorganosiloxane graft copolymer. If this composition is extrusion-molded or injection-molded under the common molding conditions, it keeps its original dispersed and mixed condition without showing a phase separation. Consequently, this composition has excellent performances described below: Impact strength also is given to the polyarylene sulfide resin without largely injuring the excellent properties inherent to the resin; when this composition contains no reinforcing filler, there is no development of a pearly lustre which is easy to appear when the polyarylene sulfide resin and other resin component are mixed; and even when this composition contains the reinforcing filler, a molded product obtained therefrom is excellent in surface smoothness.

The present invention will be further illustrated with reference to the following examples.

In the examples and referential examples, "part" means part by weight unless otherwise stated.

Measurement of Izod impact strength was carried out by the method described in ASTM D 256 using a test piece with a ⅛" in thickness and notched. Measurement of heat distortion temperature (HDT) was carried out by the method described in ASTM D 648 using a load of 18.56 kg.

Evaluation of the appearance was carried out on a flat plate of 100 mm × 100 mm × 3 mm in size prepared by injection molding. When the system contains no filler, the presence and absence of a pearly lustre was examined by visual assessment. When the system contains the filler, a surface luster (60°) was measured by means of a goniophotometer (UGV-4D) produced by Suga Shiken-ki-Co.). The result of evaluation was expressed as follows:

x Pearly lustre is observed.
o Pearly lustre is not observed.

A higher numerical value obtained by measurement with the goniophotometer means that the surface has a smoother and better appearance.

Adhesion of coating was evaluated as follows:

An acrylic urethane painting prepared from toluene diisocyanate and acrylic polyol was applied to the surface of a flat molded product and dried; eleven parallel grooves were cut into the coating at intervals of 1 mm in one direction, and the same procedure was repeated in the direction perpendicular thereto, thereby forming one hundred grid patterns of 1 mm$^2$; an adhesive tape was applied over the cross-hatched area and peeled off the area in the vertical direction to the surface of the flat molded product; and the number of the grid patterns of the coating peeled off the area was counted. The adhesion of coating was evaluated according to the following standard:

|  | Number of peeled grids |
| --- | --- |
| Excellent [⊚]: | 10 or less |
| Good [○]: | 11 to 20 |
| Inadequate [Δ]: | 21 to 40 |
| Fail [x]: | 41 or more |

REFERENTIAL EXAMPLE 1

Production of Polyorganosiloxane Graft Copolymer (S-1)

Two parts of tetraethoxysilane, 0.5 part of γ-methacryloyloxypropyldimethoxymethylsilane and 97.5 parts of octamethylcyclotetrasiloxane were mixed to obtain 100 parts of a siloxane mixture.

One part of sodium dodecylbenzenesulfonate and part of dodecylbenzenesulfonic acid were dissolved in 200 parts of distilled water, and the resulting solution was added to 100 parts of the above siloxane mixture. The resulting mixture was preliminarily stirred at 10,000 rpm with a homomixer and then emulsified with a homogenizer under a pressure of 300 kg/cm$^2$ to obtain an organosiloxane latex. This latex was transferred to a separable flask equipped with a condenser and a stirring blade, and heated at 80° C. for 5 hours with stirring and mixing and then allowed to stand at 20° C. for 48 hours. Thereafter, this latex was neutralized to a pH of 6.9 with an aqueous sodium hydroxide solution to complete polymerization. Thus, a polyorganosiloxane rubber latex (hereinafter referred to as PDMS-1) was obtained. The conversion of the siloxane mixture to the polyorganosiloxane rubber was 89.7%, and the number average particle size of the polyorganosiloxane rubber was 0.16 μm.

Thirty-three parts of this polyorganosiloxane rubber latex containing 10 parts of the polyorganosiloxane rubber was sampled and put in a separable flask equipped with a stirring blade. After 267 parts of distilled water was added thereto and the atmosphere of the flask was replaced by a nitrogen gas, the contents of the flask were heated to 50° C. At this temperature, a mixed solution of 80 parts of n-butyl acrylate, 1.6 parts of allyl methacrylate and 0.192 part of tert-butylhydroperoxide was added to allow this mixed solution to soak into the polyorganosiloxane rubber particles. Thereafter, a mixed solution of 0.001 part of ferrous sulfate, 0.003 part of disodium ethylenediaminetetraacetate, 0.24 part of Rongalite and 10 parts of distilled water was added, and radical polymerization was carried out while maintaining the inner temperature at 70°

C. for 2 hours to obtain a polyorganosiloxane compound rubber latex. To this latex was added a mixed solution of 10 parts of methyl methacrylate and 0.024 part of tert-butylhydroperoxide, and graft polymerization onto the compound rubber was carried out while maintaining the inner temperature at 70° C. for 4 hours to obtain a polyorganosiloxane graft copolymer (hereinafter referred to as S-1). The conversion of methyl methacrylate was 97.5%, and the average particle size of the graft copolymer latex was 0.20 μm. This latex was dropwise added to 600 parts of hot water containing 1.5 wt. % of calcium chloride, and the coagulated product thus obtained was filtered off, repeatedly washed with water and dried at 80° C. for 24 hours to obtain 97.7 parts of the dry powder of S-1. The latex of PDMS-1 was coagulated and dried in the same manner as S-1 in Referential Example 1. Thus, the dry powder of PDMS-1 was obtained.

REFERENTIAL EXAMPLE 2

Production of Polyorganosiloxane Graft Copolymers (S-2 to S-7)

Preparation of a compound rubber by polymerization and graft polymerization onto the compound rubber were carried out in the same manner as in Referential Example 1 except that:

(1) in the production of the compound rubber, the amount of the polyorganosiloxane rubber latex sampled, which had been obtained in the same manner as in Referential Example 1, the amount of distilled water added thereto and the amounts of n-butyl acrylate and allyl methacrylate were as shown in Table 1, and (2) in the graft polymerization onto the compound rubber, the amount of methyl methacrylate was as shown in Table 1.

The graft copolymers thus obtained are hereinafter referred to as S-2 to S-7. The conversion of methyl methacrylate, the average particle size of the polyorganosiloxane copolymer latex obtained and the yield of the dry powder of the copolymer are shown in Table 1.

REFERENTIAL EXAMPLE 3

Production of Polyorganosiloxane Graft Copolymer (S-8)

Three hundreds parts of the polyorganosiloxane rubber latex (containing 90 parts of the polyorganosiloxane rubber) obtained in the course of production of the polyorganosiloxane graft copolymer in Referential Example 1, was sampled and put in a separable flask equipped with a stirring blade. After 80 parts of distilled water was added thereto, a mixed solution of 0.001 part of ferrous sulfate, 0.003 part of disodium ethylenediaminetetraacetate, 0.24 part of Rongalite and 10 parts of distilled water was added thereto. After the atmosphere of the flask was replaced by a nitrogen gas, the contents of the flask were heated to 60° C. At this temperature, a mixed solution of 10 parts of methyl methacrylate and 0.024 part of tert-butylhydroperoxide was added to allow this mixed solution to soak into the polyorganosiloxane rubber particles. Thereafter, the graft polymerization onto the polyorganosiloxane rubber was carried out while maintaining the inner temperature at 70° C. for 2 hours to obtain a polyorganosiloxane graft copolymer (hereinafter referred to as S-8). The conversion of methyl methacrylate was 96.9%, and the average particle size of the graft copolymer latex was 0.17 μm. This latex was dropwise added to 600 parts of hot water containing 1.5 wt. % of calcium chloride, and the coagulated product thus obtained was filtered off, repeatedly washed with water and dried at 80° C. for 24 hours to obtain 98.2 parts of the dry powder of S-8.

TABLE 1

|  | S-2 | S-3 | S-4 | S-5 | S-6 | S-7 |
| --- | --- | --- | --- | --- | --- | --- |
| Polyorganosiloxane rubber latex (part) | 100 | 150 | 200 | 267 | 133 | 117 |
| Silicone rubber (part) | 30 | 45 | 60 | 80 | 40 | 35 |
| Distilled water (part) | 220 | 185 | 150 | 103 | 197 | 208 |
| n-Butyl acrylate (part) | 60 | 45 | 30 | 10 | 40 | 35 |
| Allyl methacrylate (part) | 1.2 | 0.9 | 0.6 | 0.2 | 0.8 | 0.7 |
| Methyl methacrylate (Part) | 10 | 10 | 10 | 10 | 20 | 30 |
| Conversion of methyl methacrylate (%) | 97.8 | 98.3 | 97.1 | 96.9 | 98.0 | 98.1 |
| Average particle size of the graft copolymer latex (μm) | 0.20 | 0.19 | 0.18 | 0.18 | 0.19 | 0.19 |
| Yield of the dry powder of the graft copolymer (part) | 96.3 | 97.4 | 96.9 | 97.1 | 96.5 | 97.2 |

REFERENTIAL EXAMPLE 4

Production of Polybutyl Acrylate Rubber Graft Copolymer (S-9)

Two hundreds parts of distilled water and 1 part of sodium dodecylbenzenesulfonate were put in a separable flask equipped with a stirring blade. After the atmosphere of the flask was replaced by a nitrogen gas, 88.2 parts of n-butyl acrylate, 1.8 parts of allyl methacrylate and 0.2 part of tert-butylhydroperoxide were added thereto, after which the contents of the flask were heated to 50° C. At this temperature, a mixed solution of 0.001 part of ferrous sulfate, 0.003 part of disodium ethylenediaminetetraacetate, 0.24 part of Rongalite and 10 parts of distilled water was added thereto to carry out radical polymerization. After the inner temperature was kept at 70° C. for 1 hour, a mixed solution of 10 parts of methyl methacrylate and 0.24 part of tert-butylhydroperoxide was added, and graft polymerization onto the polybutyl acrylate rubber was carried out while maintaining the inner temperature at 70° C. for 3 hours to obtain a polybutyl acrylate rubber graft copolymer (hereinafter referred to as S-9). This graft copolymer was coagulated and dried in the same manner as in Referential Example 1 to obtain 97.9 parts of the dry powder of the graft copolymer.

EXAMPLE 1

A polyphenylene sulfide resin (Ryton M2588 produced by Toray Phillips Co., Ltd.) was used as the polyarylene sulfide resin. One hundred parts of a mixture of 80 parts of this polyphenylene sulfide resin and 20 parts of the polyorganosiloxane graft copolymer S-1 obtained in Referential Example 1 was blended with 1 part of (3-glycidyloxypropyl)trimethoxysilane (KBM 403 produced by Shinetsu Chemical Industry Co., Ltd.) by means of a Henschel mixer. The resulting mixture was pelletized by extruding it through a twin-screw extruder (TEM 35B produced by Toshiba Machine Co., Ltd.) at a barrel temperature of 300° C. The pellets obtained were molded into test pieces for measuring various physical properties on an injection molding machine (Promat injection molding machine produced by Sumitomo Netstal Co., Ltd.) at a cylinder temperature of 300° C. and a mold temperature of 140° C. Various physical properties were evaluated with the test pieces obtained. The results are shown in Table 2.

EXAMPLES 2 TO 7

Preparation of test pieces and evaluation of physical properties were carried out in the same manner as in Example 1 except that the dry powder of the polyorganosiloxane graft copolymers S-2 to S-7 was used in place of the polyorganosiloxane graft copolymer S-1. These results are shown together in Table 2.

EXAMPLES 8 TO 10

Test pieces were prepared and evaluated in the same manner as in Example 1 except that the amount of (3-glycidyloxypropyl)trimethoxysilane was as shown in Table 2. The results are shown together in Table 2.

EXAMPLES 11 TO 21

Pellets were prepared in the same manner as in Example 1 except that the polyorganosiloxane graft copolymer S-1 and Ryton M2588 were used in amounts shown in Table 2, and that such organic silane compounds having an epoxy group as shown in Table 2 were used in amounts shown in the same table. Thereafter, test pieces for evaluating physical properties were prepared in the same manner as in Example 1 except that mixtures of the pellets obtained above and reinforcing fillers (GF, glass fiber; CF, carbon fiber) shown in Table 2 were used. The physical properties were measured with these test pieces, and the results are shown together in Table 2.

EXAMPLE 22

Pelletizing, preparation of test pieces by injection molding and evaluation of physical properties were carried out in the same manner as in Example 11 except that the same amount of Tohpren T-4 (trade name of a polyphenylene sulfide produced by Tophren Co., Ltd.) was used in place of Ryton M2588 as the polyarylene sulfide resin. The results are shown in Table 2.

COMPARATIVE EXAMPLES 1 TO 6

For comparison, a test piece consisting of Ryton M2588 alone (Comparative Example 1), ones consisting of Ryoton M2588 and a glass fiber (Comparative Examples 2 to 4), one consisting of Ryton M2588, a glass fiber and an organic silane compound (Comparative Example 6), one consisting of Ryton M2588, a polyorganosiloxane graft copolymer and an organic silane compound (Comparative Example 5) and one consisting of Ryton M2588 were prepared and evaluated. The results are shown in Table 3.

COMPARATIVE EXAMPLE 7

Pelletizing was tried in the same manner as in Example 1 except that the amount of (3-glycidyloxypropyl)trimethoxysilane used was made 20 parts. However, the viscosity was so high that extruding was impossible.

COMPARATIVE EXAMPLES 8 and 9

Pelletizing, preparation of test pieces by injection molding and evaluation of physical properties were carried out in the same manner as in Example 1 except that (3-glycidyloxypropyl)trimethoxysilane was replaced by (3-mercaptopropyl)trimethoxysilane ("KBM 803" produced by Shinetsu Chemical Industry Co., Ltd.) (Comparative Example 8) and (3-aminopropyl)triethoxysilane ("KBE 903" produced by Shinetsu Chemical Industry Co., Ltd.) (Comparative Example 9). The results are shown in Table 3.

COMPARATIVE EXAMPLES 10 AND 11

Pelletizing, preparation of test pieces by injection molding and evaluation of physical properties were carried out in the same manner as in Example 1 (Comparative Example 10) and Example 11 (Comparative Example 11) except that the polyorganosiloxane graft copolymer S-8 obtained in Referential Example 3 was used in place of the polyorganosiloxane graft copolymer S-1. The results are shown in Table 3.

COMPARATIVE EXAMPLES 12–14

A polyarylene sulfide resin composition was produced in the same manner as in Example 1 except that S-1 was replaced by PDMS-1 (Comparative Example 12), except that S-1 was replaced by PDMS-1 and that (3-glycidoxypropyl)trimethoxysilane was not used (Comparative Example 13), and except that (3-glycidoxypropyl)trimethoxysilane was not used (Comparative Example 14). The physical properties of these compositions were evaluated (Table 3).

TABLE 2

| Example | | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Polyorganosiloxane compound rubber | Kind | S-1 | S-2 | S-3 | S-4 | S-5 | S-6 | S-7 | S-1 | S-1 | S-1 | S-1 | S-1 | S-1 | S-1 | S-1 |
| | Amount (part) | 20 | 20 | 20 | 20 | 20 | 20 | 20 | 20 | 20 | 20 | 20 | 20 | 20 | 10 | 30 |
| Ryton M2588 (part) | | 80 | 80 | 80 | 80 | 80 | 80 | 80 | 80 | 80 | 80 | 80 | 80 | 80 | 90 | 70 |
| Tohpren T-4 (part) | | | | | | | | | | | | | | | | |
| Organic silane compound having an epoxy group | Kind | (a) | (a) | (a) | (a) | (a) | (a) | (a) | (a) | (a) | (a) | (a) | (a) | (a) | (a) | (a) |
| | Amount (part) | 1 | 1 | 1 | 1 | 1 | 1 | 1 | 0.5 | 3 | 5 | 1 | 1 | 1 | 1 | 1 |
| Reinforcing filler | Kind | | | | | | | | | | | GF | GF | GF | GF | GF |
| | Amount (part) | | | | | | | | | | | 67 | 43 | 150 | 67 | 67 |
| Izod impact strength ($\frac{1}{4}$" in thickness, notched) 23° C. (kg · cm/cm) | | 42 | 40 | 37 | 37 | 35 | 37 | 32 | 38 | 42 | 42 | 22 | 23 | 17 | 17 | 23 |
| Heat distortion temperature (°C.) | | 110 | 109 | 110 | 108 | 110 | 110 | 112 | 110 | 110 | 109 | 254 | 251 | 260 | 255 | 251 |
| Pearly lustre | | ◯ | ◯ | ◯ | ◯ | ◯ | ◯ | ◯ | ◯ | ◯ | ◯ | | | | | |
| Lustre | | | | | | | | | | | | 105 | 110 | 95 | 106 | 103 |
| Adhesion property of paint film | | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ |

| Example | | 16 | 17 | 18 | 19 | 20 | 21 | 22 |
|---|---|---|---|---|---|---|---|---|
| Polyorganosiloxane compound rubber | Kind | S-1 | S-1 | S-1 | S-1 | S-1 | S-1 | S-1 |
| | Amount (part) | 20 | 20 | 20 | 20 | 20 | 20 | 20 |
| Ryton M2588 (part) | | 80 | 80 | 80 | 80 | 80 | 80 | |
| Tohpren T-4 (part) | | | | | | | | 80 |
| Organic silane compound having an epoxy group | Kind | (a) | (a) | (a) | (a) | (b) | (c) | (a) |
| | Amount (part) | 0.5 | 5 | 1 | 1 | 1 | 1 | 1 |
| Reinforcing filler | Kind | GF | GF | GF | Talc | GF | GF | GF |

TABLE 2-continued

| | | | | | | | | |
|---|---|---|---|---|---|---|---|---|
| | Amount (part) | 67 | 67 | 43 | 55 | 67 | 67 | 67 |
| | Izod impact strength (⅛" in thickness, notched) 23° C. (kg · cm/cm) | 22 | 23 | 19 | 17 | 21 | 22 | 20 |
| | Heat distortion temperature (°C.) | 255 | 254 | 252 | 253 | 254 | 254 | 255 |
| | Pearly lustre | | | | | | | |
| | Lustre | 105 | 105 | 85 | 118 | 105 | 105 | 107 |
| | Adhesion property of paint film | ⊚ | ⊚ | ⊚ | ⊚ | ⊚ | ⊚ | ⊚ |

(a): (3-Glycidyloxypropyl)trimethoxysilane ("KBM 403" produced by Shinetsu Chemical Industry Co., Ltd.)
(b): (3-Glycidyloxypropyl)methyldiethoxysilane ("KBE 402" produced by Shinetsu Chemical Industry Co., Ltd.)
(c): 2-(3,4-Epoxycyclohexyl)ethyltrimethoxysilane ("KBM 303" produced by Shinetsu Chemical Industry Co., Ltd.)

TABLE 3

| Comparative Example | | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| Polyorganosiloxane compound rubber | Kind | | | | | S-9 | | S-1 | S-1 | S-1 | S-8 | S-8 | PDMS-1 | PDMS-1 | S-1 |
| | Amount (part) | | | | | 20 | | 20 | 20 | 20 | 20 | 20 | 20 | 20 | 20 |
| Ryton M2588 (part) | | 100 | 100 | 100 | 100 | 80 | 100 | 80 | 80 | 80 | 80 | 80 | 80 | 80 | 80 |
| Organic silane compound having an epoxy group | Kind | | | | | (a) | (a) | (a) | (d) | (e) | (a) | (a) | (a) | | |
| | Amount (part) | | | | | 1 | 1 | 20 | 1 | 1 | 1 | 1 | 1 | | |
| Reinforcing filler | Kind | | GF | GF | GF | | GF | | GF | GF | | GF | | | |
| | Amount (part) | | 67 | 43 | 150 | | 67 | | 67 | 67 | | 67 | | | |
| Izod impact strength (⅛" in thickness, notched) 23° C. (kg · cm/cm) | | 3 | 9 | 7 | 6 | 18 | 9 | —*1 | 6 | 6 | 36 | 21 | 18 | 10 | 12 |
| Heat distortion temperature (°C.) | | 115 | 269 | 265 | 269 | 103 | 267 | — | 252 | 250 | 109 | 255 | 106 | 105 | 109 |
| Pearly lustre | | ○ | | | | x | | — | | | x | | x | x | x |
| Lustre | | | 110 | 112 | 102 | | 115 | — | 60 | 54 | | 50 | | | |
| Adhesion property of paint film | | Δ | Δ | Δ | Δ | x | Δ | — | x | x | x | x | Δ | x | x |

*1: Extruding was impossible.
(d): (3-Mercaptopropyl)trimethoxysilane ("KBM 803" produced by Shinetsu Chemical Industry Co., Ltd.)
(e): (3-Aminopropyl)triethoxysilane ("KBE 903" produced by Shinetsu Chemical Industry Co., Ltd.)

What is claimed is:

1. A polyarylene sulfide resin composition obtained by melt-mixing a composition consisting essentially of
   60 to 99 parts by weight of a polyarylene sulfide resin (component A),
   1 to 40 parts by weight of a polyorganosiloxane graft copolymer (component B) obtained by graft-polymerizing one or more kinds of vinyl monomer onto a compound rubber of 0.08 to 0.6 μm in average particle size consisting of a polyorganosiloxane rubber component and a polyalkyl (meth)acrylate rubber component and having such a structure that 1 to 99 wt. % of the polyorganosiloxane rubber component and 1 to 99 wt. % of the polyalkyl (meth)acrylate rubber component have been inseparably united with each other, the total amount of the components A and B being 100 parts by weight, and
   an organic silane compound having an epoxy group (component C) of 0.01 to 10 parts by weight based on 100 parts by weight of the total amount of the components A and B.

2. A polyarylene sulfide resin composition according to claim 1, wherein the polyarylene sulfide resin is a polyphenylene sulfide resin.

3. A polyarylene sulfide resin composition according to claim 1, wherein the organic silane compound having an epoxy group is one or more of those which are represented by the formula, $$Y-R^3-Si-Z_m$$
$$R^4_{(3-m)}$$

wherein m represents an integer of 1 to 3, $R^3$ represents a single bond or an alkylene group having 1 to 3 carbon atoms, $R^4$ represents a methyl or ethyl group and Y and Z represent groups selected from the following respective groups,

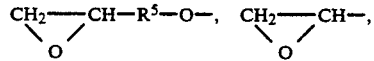

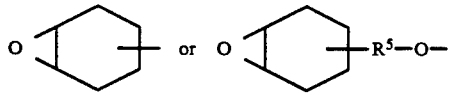

Z; —OR$^4$, —OCOR$^4$ or —Cl in which $R^5$ represents an alkylene group having 1 to 3 carbon atoms, and $R^4$ is as defined above provided that when Y represents a glycidyl group or a 3,4-epoxycyclohexyl group, $R^3$ represents a single bond or an alkylene group having 1 to 5 carbon atoms.

4. A polyarylene sulfide resin composition according to claim 3, wherein the organic silane compound having an epoxy group is one or more members selected from the group consisting of (3-glycidyloxypropyl)trimethoxysilane, (3-glycidyloxypropyl)methyldiethoxysilane and 2-(3,4-epoxycyclohexyl)ethyltrimethoxysilane.

5. A polyarylene sulfide resin composition according to claim 1, wherein the polyorganosiloxane rubber component constituting the compound rubber used in the polyorganosiloxane graft copolymer has a repeating unit of dimethylsiloxane.

6. A polyarylene sulfide resin composition according to claim 1, wherein the polyalkyl (meth)acrylate rubber component constituting the compound rubber used in the polyorganosiloxane graft copolymer has a repeating unit of polybutyl acrylate.

7. A polyarylene sulfide resin composition according to claim 1, containing a filler as an additional component in an amount of 10 to 300 wt. % based on the total amount of the components A, B and C.

8. A polyarylene sulfide resin composition according to claim 7, wherein the filler is selected from glass fibers, carbon fibers or a mixture thereof.

* * * * *